United States Patent [19]
Oshiumi

[11] Patent Number: 5,294,964
[45] Date of Patent: Mar. 15, 1994

[54] CLEANERLESS IMAGE FORMING APPARATUS

[75] Inventor: Koichiro Oshiumi, Kyoto, Japan

[73] Assignee: Murata Kikai Kabushiki Kaisha, Kyoto, Japan

[21] Appl. No.: 986,147

[22] Filed: Dec. 4, 1992

[30] Foreign Application Priority Data

Dec. 17, 1991 [JP] Japan .................. 3-333658

[51] Int. Cl.⁵ .................. G03G 15/06; G03G 15/24
[52] U.S. Cl. .................. 355/270; 355/206; 355/269; 355/296; 118/652
[58] Field of Search .......... 355/269, 270, 206, 207, 355/296; 118/652

[56] References Cited

U.S. PATENT DOCUMENTS 4,515,465  5/1985  Miyoshi et al. .................. 355/206

FOREIGN PATENT DOCUMENTS

0400563  12/1990  European Pat. Off. .......... 355/270
0411579   2/1991  European Pat. Off. .
0157661   9/1984  Japan ......................... 355/270

*Primary Examiner*—Benjamin R. Fuller
*Assistant Examiner*—J. E. Barlow
*Attorney, Agent, or Firm*—Spensley Horn Jubas & Lubitz

[57] ABSTRACT

The image forming apparatus does not have a separate cleaning unit. The image forming apparatus includes a photosensitive drum, an exposing unit for forming an electrostatic latent image on the photosensitive drum, a transfer unit for transferring toner onto a recording sheet to perform a transfer process, a paper feed mechanism for transferring the recording sheet through the transfer unit, a charging unit for charging the photosensitive drum to a predetermined voltage, a memory removing member for scattering toner remaining on the photosensitive drum upon a completion of the transfer process, a developing unit for feeding the toner over the electrostatic latent image and for recovering the toner from the photosensitive drum, and a controller for producing upon the completion of the image forming process a voltage difference between the photosensitive drum and the memory removing member so as to generate an electrostatic attracting force which causes the toner remaining on the memory removing member to be collected on the photosensitive drum. The collected toner is recovered by the developing unit later.

12 Claims, 6 Drawing Sheets

CLEANERLESS IMAGE FORMING APPARATUS

BACKGROUND OF THE INVENTION

1. Technical Field

The present invention relates to an apparatus for forming an image without a cleaner (referred to as "cleanerless image forming apparatus") and particularly to a cleanerless image forming apparatus which is used in facsimile machines, copy machines or the like.

2. Background Art

Generally in a conventional cleanerless image forming apparatus, an exposing unit forms an electrostatic latent image on a photosensitive drum, a developing unit feeds a toner over the electrostatic latent image and a transfer unit transfers the toner onto a recording sheet. The toner remaining on the photosensitive drum after the transfer operation is uniformly scattered around over the photosensitive drum by a memory removing member. The memory removing member is usually a conductive brush and located to face the photosensitive drum. Since the scattered toner still stays on the photosensitive drum, this toner is collected by the developing unit with an electrostatic attracting force while the developing unit feeds the toner onto the photosensitive drum. In this manner, the cleanerless image forming apparatus does not have a separate device exclusively used for cleaning the toner and the developing unit performs both the developing operation and the cleaning operation.

However, upon scattering the toner, if a large amount of toner adheres to the memory removing member, the toner scattering ability of the memory removing member will drop and the developing unit cannot collect the toner sufficiently. As a result, a certain amount of the above-mentioned remaining toner still remains on the photosensitive drum and is printed on the recording sheet as an afterimage during the next image forming operation (or printing operation).

Regarding this problem, another conventional cleanerless image forming apparatus performs the cleaning of the memory removing member, i.e., the toner removing, before each image forming process. In this toner removing operation, the photosensitive drum is charged to a certain plus voltage by the transfer unit while the voltage application to the memory removing member is cut to make the memory removing member voltage zero. The voltage difference between the photosensitive drum and the memory removing member produces the electrostatic attracting force which pulls the toner off the memory removing member. The pulled off toner adheres to the photosensitive drum and it is collected by the developing unit later.

However, since the above described image forming apparatus conducts the cleaning of the memory removing member upon receiving the print instruction from an operator, the printing operation does not start until the cleaning operation is completed. In other words, there is a time lag (or time loss) between the print instruction from the operator and an actual printing.

In addition, the cleaning of the memory removing member is carried out upon the print instruction from the operator and this means that the memory removing member is not cleaned until the next printing instruction comes. Thus, the toner is kept on the memory removing member until then. If a long period of time elapses before the next printing command, the toner may be solidified on the memory removing member and it may become difficult to peel the toner off the memory removing member.

Moreover, if the jamming occurs and the image forming operation is interrupted, a large quantity of toner is left on the photosensitive drum without being transferred to the recording sheet. After eliminating the jamming, if the image forming operation is restarted without any special care, the above mentioned large quantity of toner adheres on the memory removing member and the toner scattering ability of the memory removing member is deteriorated. Consequently, sufficient charging and exposing cannot be expected and the printing quality will drop.

SUMMARY OF THE INVENTION

The present invention intends to eliminate the above-described problems and its primary object is to provide a cleanerless image forming apparatus which can start the printing (image forming) promptly as it receives a printing instruction.

Another object of the present invention is to provide a cleanerless image forming apparatus which can maintain the printing quality at a proper level even after the occurrence of the jamming.

According to the first aspect of the present invention, there is provided a cleanerless image forming apparatus of a type scattering over a photosensitive drum a toner remaining on the photosensitive drum by a memory removing member after a transfer operation and recovering the scattered toner by a developing unit, characterized in that first control means is provided such that the photosensitive drum is charged and the memory removing member is adjusted to a voltage lower than a voltage of the charged photosensitive drum within a predetermined period after an image forming operation, so as to attract the toner remaining on the memory removing member to the photosensitive drum.

If this image forming apparatus is used, the cleaning process of the memory removing member is carried out within a predetermined period after the image forming process. Therefore, as compared with a conventional image forming apparatus which cleans the memory removing member only prior to the image forming process, the time delay between a print instruction from an operator and the start of the printing process is eliminated.

According to the second aspect of the present invention, there is provided a cleanerless image forming apparatus comprising a photosensitive drum, a transfer unit for performing a transfer process, a charging unit for charging the photosensitive drum, a memory removing member for dispersing toner remaining on the photosensitive drum after the transfer process, a developing unit for recovering the toner from the photosensitive drum, means for detecting an occurrence of jamming, means for interrupting an image forming process, and second control means for charging the photosensitive drum before the image forming process while adjusting the memory removing member to a voltage lower than the charged photosensitive drum, if the jamming is detected, so as to cause the toner remaining on the memory removing member to be collected on the photosensitive drum.

This image forming apparatus eliminates the problem of a conventional image forming apparatus in which jamming occurs. Specifically, if the jamming is detected, the image forming process is interrupted and the memory removing member cleaning is performed before the image forming process is resumed. Therefore, a large quantity of toner does not remain on the photosensitive drum and normally the memory removing member only needs to clean out a small quantity of toner from the photosensitive drum. This means that the memory removing member always functions appropriately.

These and other objects, aspects and advantages of the present invention will become more apparent by reference to the following detailed description as taken in conjunction with various figures and appended claims.

DETAILED DESCRIPTION OF THE PREFERRED EMBODIMENTS

Now, a preferred embodiment of the present invention will be described with reference to the accompanying drawings.

Figure 1:
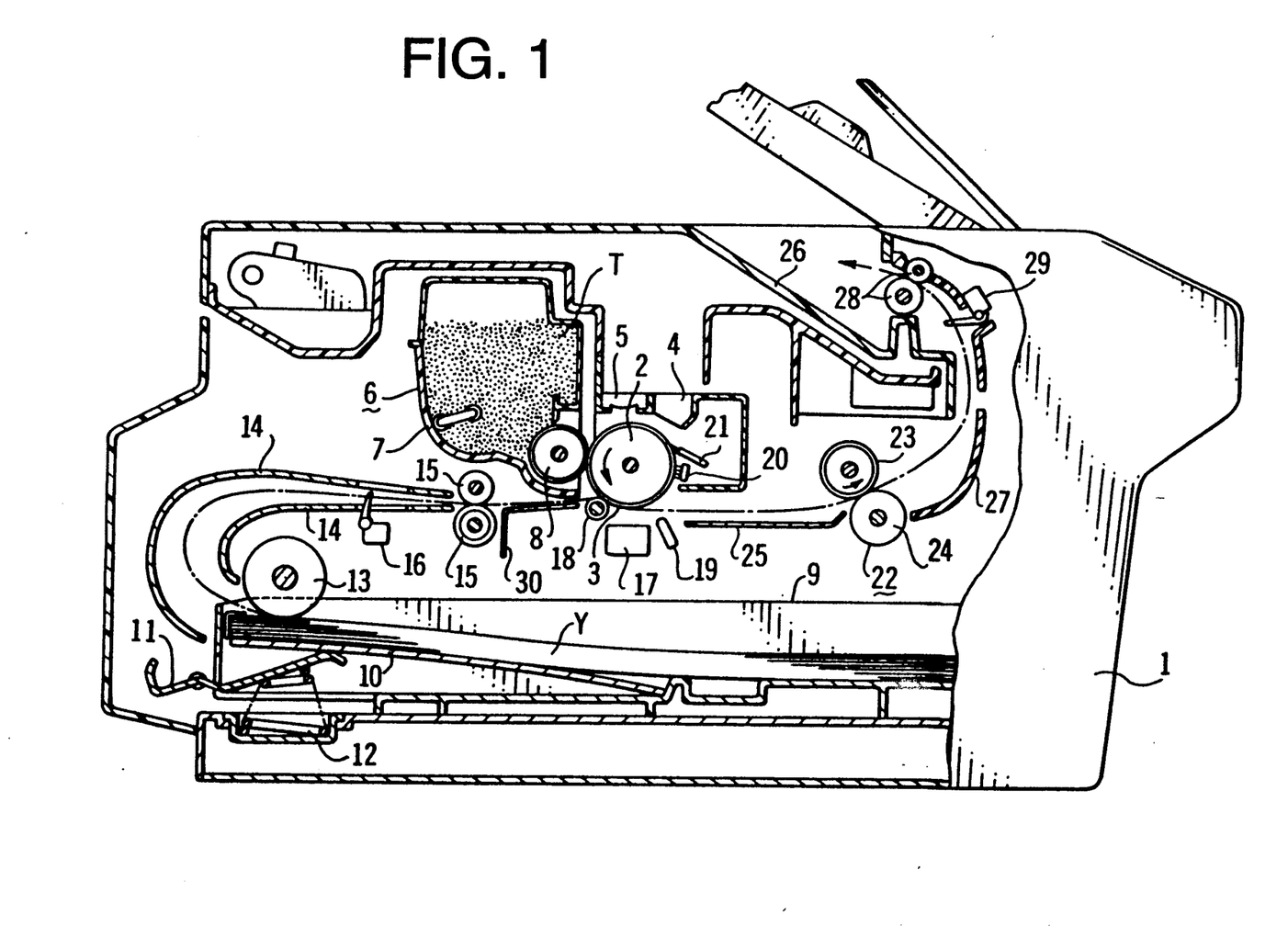
FIG. 1 shows a sectional view of a cleanerless image forming apparatus according to the present invention.
Figure 6:
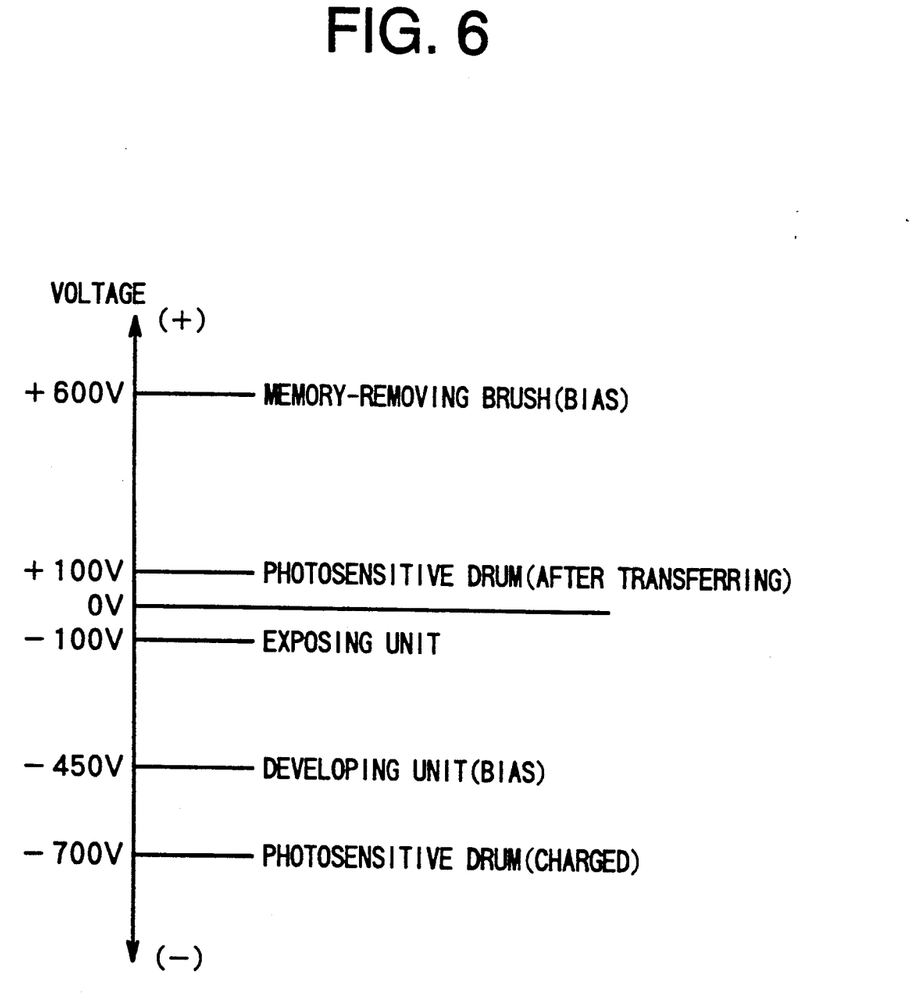
FIG. 6 is a graph showing setting voltage of various components of the image forming apparatus of FIG. 1.

Referring first to FIG. 1, a photosensitive drum 2 extends transversely (vertical direction to the drawing sheet) in the middle of a casing 1. The photosensitive drum 2 is rotated by a drive motor 34 (FIG. 2) as required. A photoconductive layer 3 is formed over the surface of the drum 2. A charging unit 4 uniformly charges the photo-conductive layer 3 to a predetermined voltage ($-700$ V in this embodiment), as shown in FIG. 6. The exposing unit 5 irradiates to form an electrostatic latent image of predetermined voltage ($-100$ V in the embodiment) on the photosensitive drum 2. The developing unit 6 includes a toner casing 7 and a developing roller 8. The toner T is stored in the toner casing 7. The developing roller 8 applies a predetermined voltage ($-450$ V in this embodiment) to the toner T. The voltage difference between the toner T and the electrostatic latent image makes the toner T adhere to the electrostatic latent image so that the electrostatic latent image becomes visualized.

A paper feed cassette 9 extends in a lower area of the housing 1 and a number of recording sheets Y are stacked in the cassette 9. A lift-up plate 10 is provided at the bottom of the cassette 9. The lift-up plate 10 is inclinable upward in the cassette 9. A front portion of the stack of sheets Y is supported by the lift-up plate 10. A lift-up lever 11 is pivotably supported by the housing 1. When the paper feed cassette 9 is inserted into the housing 1, a spring 12 pushes the lift-up lever 11 upward and in turn the lift-up lever 11 lifts the lift-up plate 10. A paper feed roller 13 is provided inside an apparatus frame 1 and rotated by a drive motor 35 (FIG. 2) as required. Upon the insertion of the paper feed cassette 9 into the housing 1, the front portion of the paper stack Y is biased to the paper feed roller 13 by the spring 12.

Figure 2:
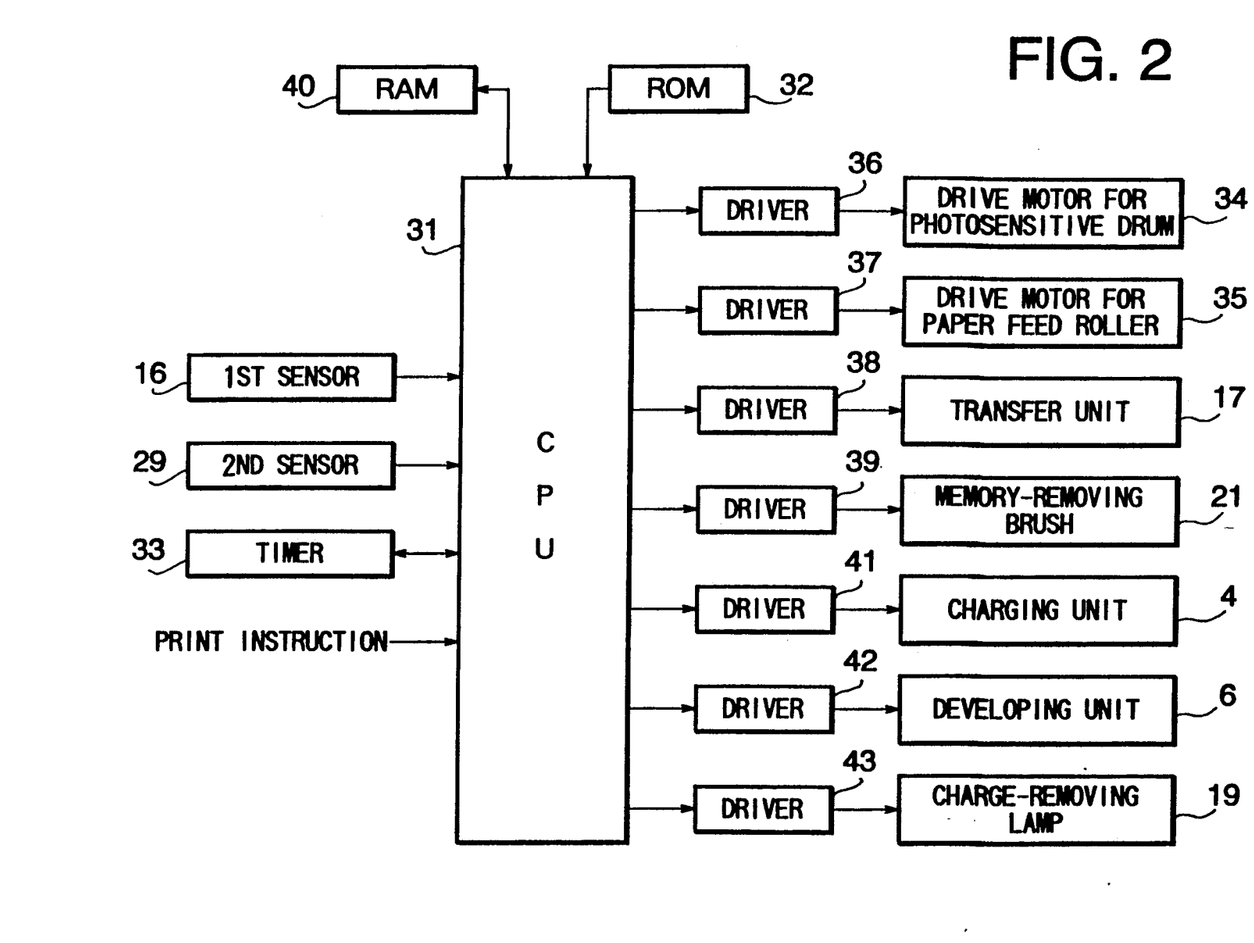
FIG. 2 is a block diagram of major components of the cleanerless image forming apparatus of FIG. 1.

As the paper feed roller 13 rotates, the recording sheet Y is moved out of the cassette 9. The recording sheet Y is then guided under the photosensitive drum 2 through paper guides 14 and 30 and a couple of feed rollers 15. A first sensor 16 is attached to the paper guide 14 to detect the paper Y moving in the paper guide 14. The first sensor 16 outputs a detection signal to a CPU 31 (FIG. 2). The first sensor 16 can detect a front end of the paper Y. The transfer roller 18 presses the paper Y, which is fed between the feed rollers 15, against the photosensitive drum 2. The transfer unit 17 applies a predetermined voltage to that part of the paper Y which contacts the drum 2, and due to the difference between this voltage and the toner image voltage, the toner image is transferred onto the paper Y.

After the transfer process, a charge-removing lamp 19 exposes the surface of the photosensitive drum 2 to remove the charge therefrom. A brush 20 is provided to remove paper dusts or the like from the photosensitive drum 2 after the transfer process. A memory removing brush 21, which is made from a conductive brush and functions as the memory removing member, contacts the surface of the photosensitive drum 2 so as to scatter around over the photosensitive drum 2 the toner T remaining on the photosensitive drum 2 after the transfer process. The scattered toner T uniformly disperses over the drum 2. A predetermined voltage ($+600$ V in this embodiment) is applied to the memory removing brush 21. The developing unit 6 simultaneously performs the developing process and the cleaning process. In other words, during the developing process, the developing unit 6 gathers the scattered toner T by means of its electrostatic attracting force.

A heating and fixing unit 22 is provided in the housing 1. This unit 22 includes a heating roller 23 and a pressing roller 24. The paper passage (as indicated by the broken line in FIG. 1) extends between the heating and pressing rollers 23 and 24. The pressing roller 24 contacts the heating roller 23 with a predetermined pressure. As the paper Y proceeds on a paper guide 25 and between these rollers 23 and 24, the toner image on the paper Y is heat-fixed. A stacker 26 is formed at the top of the housing 1 so that the paper Y, after the image fixing, is transferred to the stacker 26 by a paper guide 27 and a pair of guide rollers 28. A second sensor 29 is attached to the paper guide 27 to detect the paper Y moving in the paper guide 27. The second sensor 29 also outputs a detection signal to the CPU 31 (FIG. 2). The second sensor 29 can detect a front end of the paper Y and a tail end of the paper Y.

Next, major components of the cleanerless image forming apparatus will be explained.

Referring to FIG. 2, a ROM 32, a RAM 40 and a timer 33 are connected to a CPU 31, respectively. A program for controlling an overall operation of the image forming apparatus is stored in the ROM 32 and various data is temporarily stored in the RAM 40. As mentioned earlier, the detection signals from the first and second sensors 16 and 29 are input to the CPU 31. A printing instruction from an operator is also input to the CPU 31. The CPU 31 outputs activation and deactivation signals to the drive motor 34 of the photosensitive drum 2, the drive motor 35 of the paper feed roller 13 and the charge-removing lamp 19 via drivers 36, 37 and 43 respectively. In addition, the CPU 31 controls drivers 38, 39, 41 and 42 such that the transfer unit 17, the memory removing brush 21, the charging unit 4 and the developing unit 6 are given predetermined voltage at predetermined timings respectively.

In this embodiment, the CPU 31 and the ROM 32 constitute the control means for performing the cleaning of the memory-removing brush 21 after the image forming process. Specifically, after the image forming process, the CPU 31 controls the drivers 38 and 39 on the program stored in the ROM 32 such that the surface of the photosensitive drum 2 is positively charged by the transfer unit 17 at a predetermined timing while interrupting the voltage supply to the memory removing brush 21.

The CPU 31, the ROM 32, the first sensor 16, the second sensor 29 and the timer 33 constitute means for detecting the occurrence of jamming. Specifically, when the image forming process starts and the paper feed roller 13 rotates, the CPU 31 judges that the jamming has occurred and interrupts the image forming process, if the detection signal is not input to the CPU 31 from the first sensor 16 within a first predetermined period set by the timer 33. The detection signal is generated when the first sensor 16 finds the front end of the paper Y.

Even if the CPU 31 receives the paper front end detection signal from the first sensor 16 within the first period, the CPU 31 judges that the jamming has occurred and stops the image forming process, as long as the paper front end detection signal from the second sensor 29 is not input to the CPU 31 within a second predetermined period set by the timer 33. Further, even if the CPU 31 receives the paper front end detection signal from the second sensor 29 within the second period, the CPU 31 judges that the jamming has occurred and stops the image forming process, if the paper tail end detection signal is not sent from the second sensor 29 within a third predetermined period set by the timer 33.

In this embodiment, the CPU 31 and the ROM 32 constitute the control means for performing upon detection of jamming the cleaning of the memory removing brush 21 prior to the restarting of image forming process. Specifically, when the CPU 31 judges that the jamming has occurred, the image forming operation is interrupted temporarily. The image forming operation will be resumed after the elimination of the jamming. At this time, the CPU 31 controls the drivers 38 and 39 in a manner such that the transfer unit 17 charges the photosensitive drum 2 to a positive voltage for a predetermined period while stopping the voltage supply to the memory removing brush 21. The image forming operation restarts after this.

Next, an operation of the cleanerless image forming apparatus will be explained.

Figure 3:
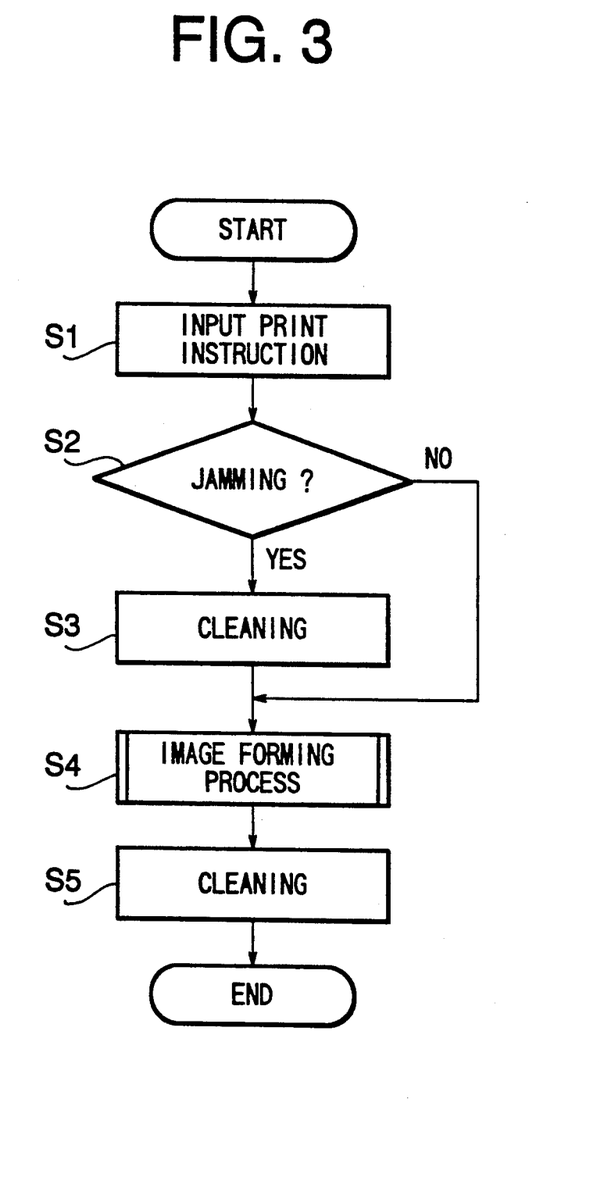
FIG. 3 is a flow chart showing an operation of the image forming apparatus of FIG. 1.

The image forming apparatus operates as shown in the flow chart of FIG. 3 under the control of CPU 31. Specifically, as the print command is input to the CPU 31 from the operator, it is checked whether or not the jamming is detected prior to the arrival of the print command (steps 1 and 2). If the answer at step 2 is YES, the cleaning of the memory removing brush 21 is conducted (step 3) and the image forming process is restarted (step 4). On the other hand, if the answer at step 2 is NO, the image forming process is immediately carried out (steps 2 and 4). After the image forming operation, the memory removing brush 21 is cleaned (step 5) and the image forming operation is completed.

During the image forming process of step 4, the occurrence of jamming is always monitored. Specifically, referring now to FIG. 4, as the image forming process starts (step 11), the drive motor 35 rotates the paper feed roller 13 to send the paper Y out of the paper cassette 9 (step 12). When the paper feed roller 13 starts rotating, the arrival of the paper Y detection signal from the first sensor 16 within the predetermined period set by the timer 33 is monitored (step 13). If the paper Y detection signal (paper front end detection signal) does not reach the CPU 31 within the predetermined period (step 14), it is judged that the jamming has occurred (step 19) and therefore the image forming operation is interrupted (step 20).

Figure 4:
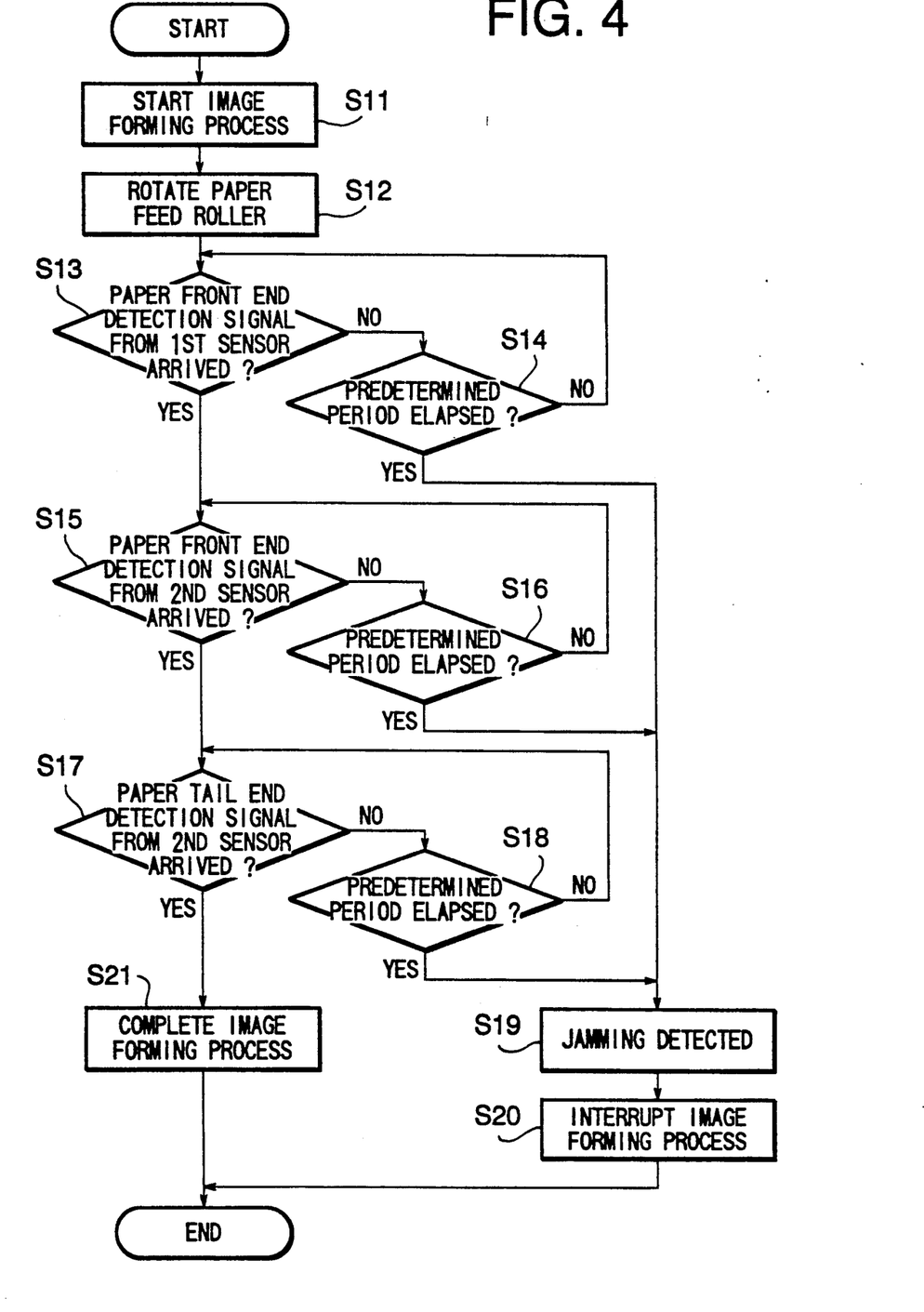
FIG. 4 depicts a flow chart showing how the jamming is monitored during the image forming process.

Even if the front end of the paper Y passes over the first sensor 16 and the detection signal is sent to the CPU 31 from the first sensor 16, it is judged that the jamming has occurred and the image forming operation is interrupted, if the paper front end detection signal is not sent to the CPU 31 from the second sensor 29 within the predetermined period set by the timer 33 (steps 15, 16, 19 and 20). In addition, even if the paper Y proceeds below the photosensitive drum 2, passes over the second sensor 29 and the paper front end detection signal is sent to the CPU 31 from the second sensor 29, it is judged that the jamming has occurred and the image forming operation is interrupted, if the paper tail end detection signal is not sent to the CPU 31 from the second sensor 29 within the predetermined period set by the timer 33 (steps 17–20). If the tail end of the paper Y passes over the second sensor 29 and the tail end detection signal is sent to the CPU 31 from the second sensor 29 within the above mentioned predetermined period (step 17), it is judged that the jamming has not occurred so that the image forming process (printing process) is completed and the paper Y is discharged into the stacker 26 (step 21).

Figure 5:
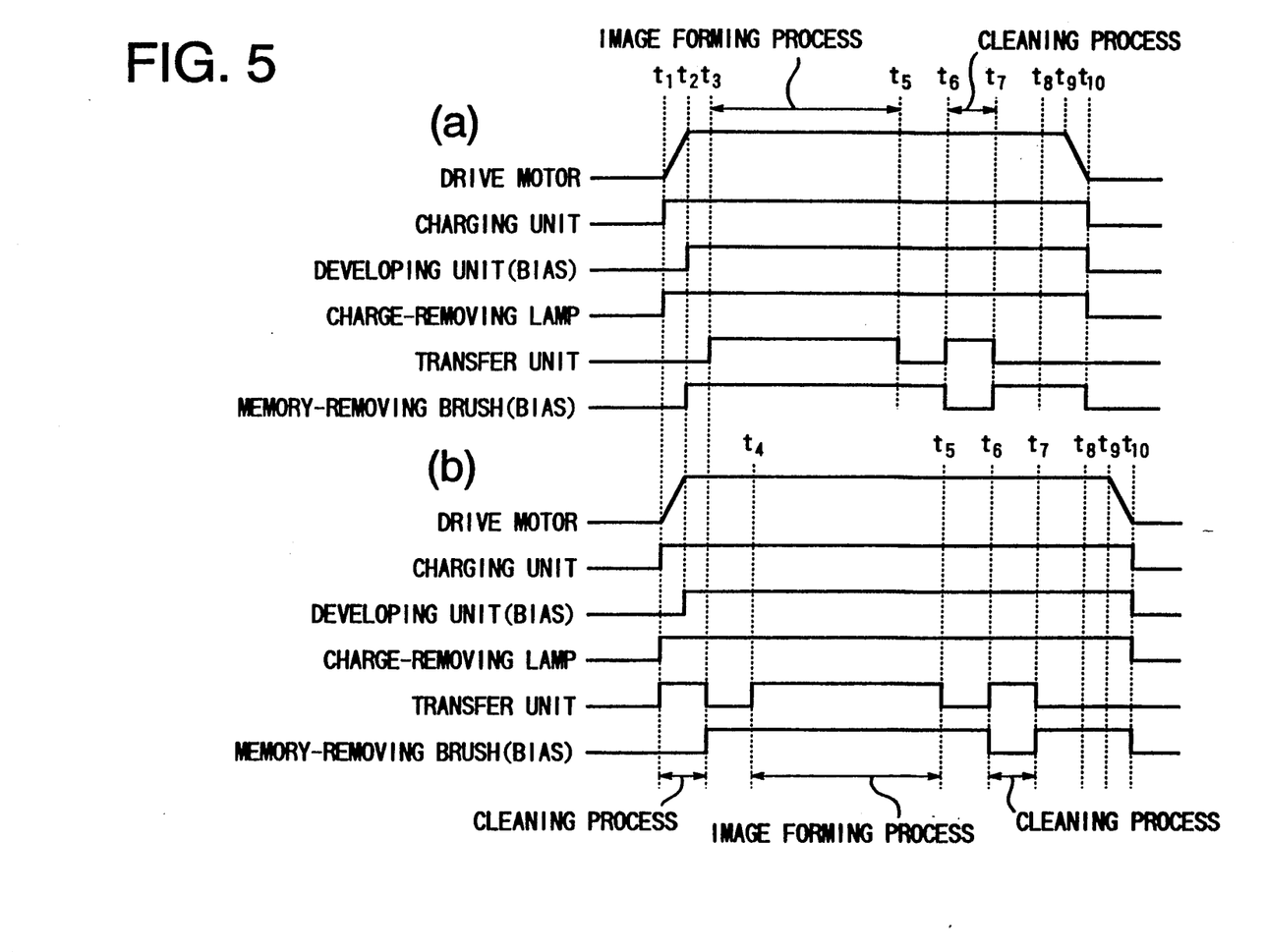
FIG. 5 is a time chart during the image forming process.

FIG. 5 shows an operation time chart of major components of the image forming apparatus. FIG. 5(a) illustrates a case where no jamming is detected and FIG. 5(b) illustrates a case where jamming is detected. As appreciated from FIG. 5(a), when the print instruction is input to the CPU 31, the drive motor 34 of the photosensitive drum 2 is turned on at the time t1. At the same time, the charging unit 4 and the charge-removing lamp 19 are turned on. At the time t2, i.e., when the drive motor 34 reaches a predetermined revolution speed, a bias voltage is applied to the developing unit 6 (referred to as "the developing bias (voltage) being turned on"). The drive motor 34 is turned off at the time t9 so that the revolution speed of the drive motor 34 drops and becomes zero at the time t10. At the time t10, the charging unit 4, the developing bias voltage and the charge-removing lamp 19 are turned off.

Now, the operation of the transfer unit 17 and the memory removing unit 21 will be explained. A bias voltage is applied to the memory removing brush 21 (referred to as "memory removing bias being turned on") at the same time (t2) as the developing bias voltage is turned on. As a result, the voltage is applied to the memory removing brush 21 and the memory removing brush 21 is charged to +600 V. The transfer unit 17 is turned on at the time t3 and the printing operation starts. During the printing operation, the charged memory removing brush 21 scatters the toner T remaining on the photosensitive drum 2 while the developing unit 6 collects the toner T. Therefore, when no jamming is detected, the image forming operation (or printing operation) starts immediately upon the print instruction from the operator, without performing the memory removing brush cleaning operation. Accordingly, there is no substantial time delay between the print command from the operator and the start of the printing operation.

The transfer unit 17 is turned off at the time t5 to terminate the printing operation and turned on again at the time t6. The memory removing bias is also turned off at the time t6. At the time t7, the transfer unit is turned off again whereas the memory removing bias is turned on. Consequently, the photosensitive drum 2 is charged to +100 V by the transfer unit 17 whereas the memory removing brush 21 is maintained to zero voltage between the time t6 and the time t7. The difference between the photosensitive drum surface voltage and the memory removing brush voltage causes the toner adhering on the memory removing brush 21 to leave for the photosensitive drum 2 due to the electrostatic attracting force. This is the cleaning of the memory removing brush 21.

The memory removing bias, which has been turned on at the time t7, is now turned off at the time t10. Therefore, the toner T which is collected on the photosensitive drum 2 by the electrostatic attracting force is scattered around over the photosensitive drum 2 by the memory removing brush 21 between the time t7 and the time t10. After that, the toner T is recovered by the developing unit 6. In this manner, the toner T remaining on the photosensitive drum 2 is completely cleaned off the photosensitive drum 2 and the entire operation of the image forming apparatus is completed.

In this embodiment, unlike the conventional image forming apparatus, since the memory removing brush 21 is cleaned immediately after the completion of the image forming process, there is no time delay between the printing instruction given by the operator and the start of the next image forming process. In other words, if the operator desires, the printing operation starts immediately. In addition, unlike the conventional image forming apparatus, since the toner T remaining on the memory removing brush 21 is cleaned out upon the completion of the image forming process, the toner T is not held on the memory removing brush 21 until the next printing process, and the toner T does not firmly (or fixedly) adhere to the memory removing brush 21. Accordingly, the scattering ability of the memory removing brush 21 does not drop due to the toner T which remains on the memory removing brush 21 and a high quality printing can be always expected.

If the jamming is detected, the image forming operation is interrupted. The image forming operation is restarted after the elimination of the jamming. Then, unlike the case of FIG. 5(a), the transfer unit 17 is turned on at the time t1 as the drive motor 34 is turned on, as shown in FIG. 5(b). The transfer unit 17 is turned off at the time t3. Therefore, the transfer unit 17 charges the photosensitive drum 2 to +100 V between the time t1 and the time t3. On the other hand, the memory removing bias is in the off state and maintained at zero between the time t1 and the time t3. As a result, the difference between the photosensitive drum surface voltage and the memory removing brush voltage causes the toner T remaining on the memory removing brush 21 to transfer to the photosensitive drum 2. In this manner, the cleaning operation of the memory removing brush 21 is performed.

The memory removing bias is turned on at the time t3 and the transfer unit 17 is turned on again at the time 4 to restart the printing operation. The toner T collected on the photosensitive drum 2 by the electrostatic attracting force during the cleaning operation is scattered by the memory removing brush 21 and recovered by the developing unit 6 between the time t3 and the time t4. Even during the printing operation, the memory removing brush 21 scatters the toner T remaining on the photosensitive drum 2 and the developing unit 6 collects the toner T. When the printing operation is completed, the cleaning operation is conducted before the end of the entire operation of the image forming apparatus, like the case of FIG. 5(a). In this case (FIG. 5(b)), since the cleaning operation is conducted twice, i.e., before the image forming operation (t1-t3) and after the image forming operation (t6-t7), the entire operation period becomes longer by the period t3-t4 as compared with the case of FIG. 5(a).

When the jamming is detected and the image forming process is interrupted, a large amount of toner T stays on the photosensitive drum 2 without being transferred to the paper Y. Thus, if the image forming process is resumed from this state, a large amount of toner T adheres to the memory removing brush 21. In this embodiment, however, when the jamming is detected, the memory removing brush 21 is cleaned prior to the image forming process. Almost no toner remains on the memory removing brush 21 when the image forming process is restarted. Therefore, it ensures that the memory removing brush 21 uniformly disperses the toner T remaining on the photosensitive drum 2 and the developing unit 6 recovers the toner T, as usual. As a result, the toner T is not transferred to the paper Y as an afterimage and there is not deterioration in printing quality. Further, eliminated is the problem of toner T dropping from the memory removing brush 21 and staining the paper Y extending below the memory removing brush 21 and peripheral components.

We claim:

1. An image forming apparatus, comprising:
   a photosensitive drum adapted to hold a toner image,
   a transfer unit for applying a transfer unit voltage to a recording sheet such that the toner image is transferred from the photosensitive drum to the recording sheet,
   a memory removing member having a voltage applied thereto by a voltage source,
   control means, operable at a predetermined time after an image forming operation, for charging the photosensitive drum to a predetermined voltage with the transfer unit and for adjusting the voltage applied to the memory removing member to a voltage lower than the predetermined voltage, whereby toner remaining on the memory removing member after the image forming operation is transferred to the photosensitive drum.

2. The image forming apparatus of claim 1, wherein the control means defines first control means, the apparatus further comprising:
   means for detecting a jam,
   means for interrupting an image forming operation in response to a detection of a jam, and
   second control means, operable at a predetermined time after the detection of a jam and prior to a restarting of the image forming operation, for charging the photosensitive drum to a predetermined voltage with the transfer unit and for adjusting the voltage applied to the memory removing member to a voltage lower than the predetermined voltage, whereby toner remaining on the memory removing member after the interrupted image forming operation is transferred to the photosensitive drum.

3. A cleanerless image forming apparatus, comprising:

a photosensitive drum, charging means for charging the photosensitive drum to a predetermined voltage, exposing means for forming an electrostatic latent image on the photosensitive drum, developing means for feeding the toner over the electrostatic latent image and for recovering the scattered toner from the photosensitive drum, toner transfer means for transferring toner from the photosensitive drum to a recording sheet during a transfer process, the toner transfer means having a voltage applied thereto, sheet transfer means for transferring the recording sheet past the toner transfer means, memory removing means for scattering toner remaining on the photosensitive drum after a completion of the transfer process, said memory removing means having a voltage, and control means, operable at a predetermined time after an image forming operation, for charging the photosensitive drum to a predetermined voltage with the toner transfer means and for adjusting the voltage of the memory removing means to a voltage lower than the predetermined voltage, whereby an electrostatic attracting force is generated between the photosensitive drum and the memory removing means and toner is transferred from the memory removing means to the photosensitive drum.

4. The image forming apparatus of claim 3, wherein the recording sheet defines a front end and travels on a sheet path, the apparatus further comprising:

timer means for setting at least one time period, interrupt means for interrupting the image forming operation, and first sensor means for detecting the front end of the recording sheet at a position on the sheet path prior to the toner transfer means, the first sensor means producing a first detection signal in response to a detection of the front end of the recording sheet, wherein the control means determines that a jam has occurred and the interrupt means interrupts the image forming operation if the control means does not receive the first detection signal within a first time period set by the timer means and the toner transfer means transfers toner to the recording sheet in response to a print instruction if the control means receives the first detection signal within the first time period.

5. The image forming apparatus of claim 4, wherein the developing means feeds toner to the electrostatic latent image at substantially the same time that it recovers the toner from the photosensitive drum.

6. The image forming apparatus of claim 4, further comprising:

second sensor means for detecting an end of the recording sheet at a position on the sheet path after the toner transfer means, the second sensor means producing a front end detection signal in response to a detection of the front end of the recording sheet, and wherein the control means determines that a jam has occurred and the interrupt means interrupts the image forming operation if the control means does not receive the front detection signal within a second time period set by the timer means.

7. The image forming apparatus of claim 6, wherein the recording sheet defines a rear end, the second sensor means produces a rear end detection signal in response to a detection of the rear end of the recording sheet, and the control means determines that a jam has occurred and the interrupt means interrupts the image forming operation if the control means does not receive a rear end detection signal within a third time period set by the timer means.

8. The image forming apparatus of claim 1, the apparatus further comprising:

means for generating a voltage difference between the photosensitive drum and the memory removing member between the interruption of an image forming operation and a restarting of the image forming operation, the voltage difference producing an electrostatic attracting force which causes toner remaining on the memory removing means at the interruption to be transferred to the photosensitive drum.

9. The image forming apparatus of claim 3, wherein the control means defines first control means, the apparatus further comprising:

means for detecting a jam, means for interrupting an image forming operation in response to a detection of a jam, and second control means, operable at a predetermined time after an interruption of an image forming operation and prior to a restarting of the image forming operation, for charging the photosensitive drum to a predetermined voltage with the toner transfer means and for adjusting the voltage of the memory removing means to a voltage lower than the predetermined voltage, whereby an electrostatic attracting force is generated between the photosensitive drum and the memory removing means and tone is transferred from the memory removing means to the photosensitive drum.

10. The image forming apparatus of claim 9, wherein the memory removing means scatters toner on the photosensitive drum and the developing means recovers the scattered toner.

11. The image forming apparatus of claim 8, wherein the memory removing means scatters toner on the photosensitive drum and the developing means recovers the scattered toner.

12. The image forming apparatus of claim 10, wherein the developing means feeds toner over the electrostatic latent image at substantially the same time that it recovers toner from the photosensitive drum.

* * * * *